United States Patent [19]

Ekstrand

[11] Patent Number: 4,953,176
[45] Date of Patent: Aug. 28, 1990

[54] ANGULAR OPTICAL CAVITY ALIGNMENT ADJUSTMENT UTILIZING VARIABLE DISTRIBUTION COOLING

[75] Inventor: John P. Ekstrand, Palo Alto, Calif.
[73] Assignee: Spectra-Physics, San Jose, Calif.
[21] Appl. No.: 319,985
[22] Filed: Mar. 7, 1989
[51] Int. Cl.[5] .......................... H01S 3/08; H01S 3/04
[52] U.S. Cl. ..................... 372/107; 372/34; 372/9; 372/33; 372/108
[58] Field of Search ................. 372/33, 34, 38, 29, 372/9, 107, 108

[56] References Cited

U.S. PATENT DOCUMENTS

| | | | |
|---|---|---|---|
| 3,662,279 | 5/1972 | Sandstrom et al. | 372/34 |
| 4,064,466 | 12/1977 | Seiki et al. | 372/107 |
| 4,190,511 | 2/1980 | Shintaka | 372/107 |
| 4,217,559 | 8/1980 | Van den Brink et al. | 372/107 |
| 4,730,323 | 3/1988 | Seaton | 372/34 |
| 4,823,348 | 4/1989 | Hercher | 372/34 |

FOREIGN PATENT DOCUMENTS 0217084 4/1987 European Pat. Off. ............... 372/36

OTHER PUBLICATIONS

*Model 161C OEM Air-Cooled Argon Ion Laser*, Spectra-Physics Product Brochure, Spectra-Physics, Mountain View, Calif.

Primary Examiner—William L. Sikes
Assistant Examiner—Georgia Y. Epps
Attorney, Agent, or Firm—Fliesler, Dubb, Meyer & Lovejoy

[57] ABSTRACT

Misalignment of a laser beam due to bending of a plasma tube for an internal resonator ion laser, or another structural element supporting beam guiding optics, is controlled by varying the distribution of heat flow out of the plasma tube or structural element to compensate for any misalignment in response to position of the laser beam. A detector is mounted along the optical path of the laser beam, and generates a position signal indicating drift of the laser beam from a preferred position. A cooling system, thermally connected to the structural material of the plasma tube or the structural element and connected to the detector, conducts heat out of the structural material in a controlled distribution in response to the position signal, so that misalignment of the optics due to thermal bending is minimized.

21 Claims, 2 Drawing Sheets

1

ANGULAR OPTICAL CAVITY ALIGNMENT ADJUSTMENT UTILIZING VARIABLE DISTRIBUTION COOLING

BACKGROUND OF THE INVENTION

1. Field of the Invention

The present invention relates to alignment of a laser optical cavity when mirrors, or other beam guiding elements, are attached to a structural member, such as a plasma tube, and thermal gradients in the structural member cause bending of the structural member, and resulting misalignment of the cavity.

2. Description of Related Art

The common design for a gas laser involves use of relatively thick ceramic plasma tube enclosing a plasma laser gain medium with cavity defining mirrors mounted on each end of the tube. The ceramic tube will absorb heat from the gain medium which must be conducted away from the system. Heat is typically removed from the plasma tube by coupling cooling fins on the outside of the tube and flowing a cooling medium across the fins. In practice, it has been difficult to provide for symmetrical heat flow out of the plasma tube. So, thermal gradients arise in the structure that cause bending of the tube. Bending results in misalignment of the cavity and drift of the mode position.

The typical prior art system is exemplified by Model 161 air-cooled ion laser, commercially available from Spectra-Physics in Mountain View, Calif. The Model 161 has cooling fins mounted orthogonally to the optical path through the plasma tube. Air is drawn across the cooling fins in a transverse flow and the fin lengths are trimmed to provide nearly uniform heat flow in all radial directions out of the plasma tube in the expected set of operating conditions. This structure suffers the disadvantage that it requires consistent thermal and mechanical structure, making it difficult to manufacture, and is only perfectly compensated for one set of operating conditions.

An alternative system may use an axial cooling flow along the optical path of the plasma tube. However, in practice, it is very difficult to implement axial systems because they require perfect radial thermal and mechanical symmetry.

Bending of the plasma tube can be decoupled from alignment of the optical cavity by using an external resonator, that is, a resonator where the mirrors are not connected to the plasma tube. This kind of system has proved very expensive to implement and is not practical for many applications.

Accordingly, it is desirable to provide a stable optical cavity for a laser with no external resonator components over a wide range of operating conditions. More generally, it is desirable to control bending of structural members supporting a gain medium and a beam guiding element caused by thermal gradients in the structural members.

SUMMARY OF THE INVENTION

The present invention provides a stable optical cavity for a laser, such as an air-cooled ion laser without external resonator components. The invention operates by detecting misalignment of the laser beam due to bending of the plasma tube, and varying the distribution of heat flow out of the plasma tube to compensate for any misalignment.

According to one aspect, the present invention is a laser apparatus having an optical path for a laser beam. The apparatus comprises a structural member, such as a plasma tube, having a first end and a second end, through which the laser beam passes along the optical path between the first and second ends. The structural member is coupled to a heat source, such as a laser gain medium with an active region, and comprises a heat conducting structural material. The structural material is characterized by thermal expansion/contraction causing bending due to thermal gradients in the structural material. At least one optical element is mounted on the structural member for guiding the laser beam along the optical path. A detector is mounted along the optical path of the laser beam, and generates a position signal indicating drift of the laser beam from a preferred position. A cooling system, thermally coupled to the structural material of the structural member and connected to the detector, conducts heat out of the structural material in a controlled distribution in response to the position signal, so that misalignment due to bending of the structural member is reduced.

Other aspects and advantages of the present invention can be determined upon review of the figures, detailed description and claims which follow.

DETAILED DESCRIPTION

A detailed description of preferred embodiments of the present invention is provided with reference to the figures.

Figure 1:
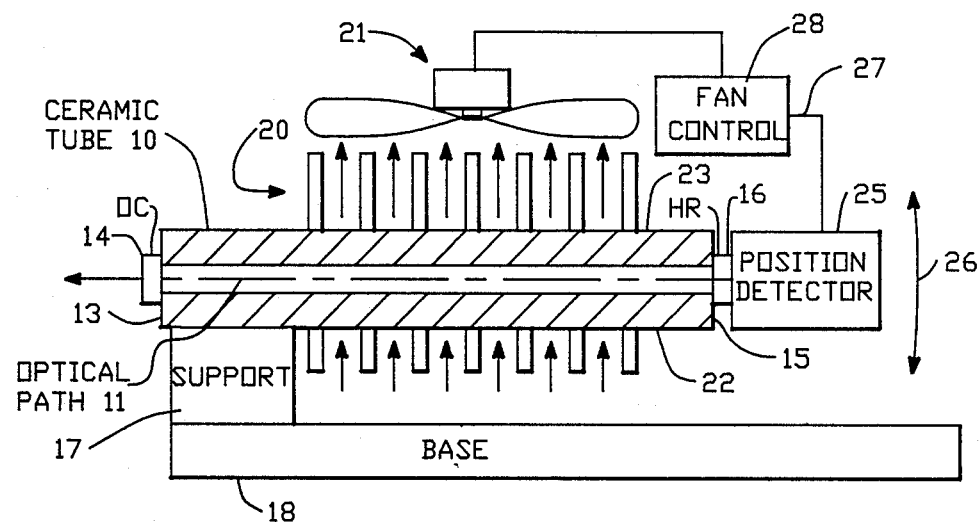
FIG. 1 is a schematic diagram of a air-cooled ion laser with an alignment adjustment system according to the present invention.

FIG. 1 illustrates an air-cooled ion laser, similar to the Spectra-Physics Model 161. The laser includes a ceramic plasma tube 10 which encloses a plasma gain medium along optical path 11. An output coupler 14 is mounted on a first end 13 of the ceramic tube 10. A high reflecting mirror 16 is mounted on the second end 15 of the ceramic tube 10. The ceramic tube 10 is supported near the first end 13 by mechanical support structure 17 which is schematically illustrated. The support structure 17 is mounted on laser base 18.

As plasma within the ceramic tube 10 is heated, heat is transferred into the ceramic tube 10. The ceramic tube is subject of thermal expansion and contraction. Therefore, when a thermal gradient exists across the tube, it will bend so that the relationship of the high reflector 16 to the output coupler 14 changes. These changes in the relationship between the output coupler 14 and the high reflector 16 alter the resonant mode within the cavity and have an effect on alignment of the output beam.

To remove heat from the ceramic tube 10, the plurality of cooling fins 20 are transversely mounted along a portion of the length of the tube 10. The fins are schematically illustrated in FIG. 1 for a more detailed description for how to implement the fins, reference is made to the Spectra-Physics Model 161.

A fan 21 draws a cooling medium, in this case air, across the cooling fins to remove heat from the ceramic tube. The fins are shaped so that the heat conducts out of the ceramic tube in a substantially symmetric pattern for a preferred set of operating conditions. Thus, the fins are shorter on the side 22 opposite the fan than on the side 23 adjacent the fan. Air contacting the fins on the side 22 will be cooler than air passing across the fins on the side 23, so a higher heat conduction rate per unit area occurs on the side 22. Thus, the fins are cut to balance the heat flow distribution as well as possible.

When the operating conditions of the laser are varied, the shape of the fins and the air flow across the fins may not match the heat flow characteristics of the system. Accordingly, a position detector 25 is mounted along the optical path of the laser beam outside of the ceramic tube 10. As the tube 10 bends as illustrated by the arrow 26, the beam position walks across a detector surface in the position detector 25. The position detector 25, in turn, generates a position signal on line 27 indicating misalignment of the high reflector 16 and the output coupler 14.

The detector 25 is preferably formed using a Quad-Cell which has a detector surface (not shown) which is substantially orthogonal to, and intersected by, the optical path of the laser beam.

The position signal is supplied to fan control logic 28. The fan control logic 28 controls the fan 21 to vary the heat flow distribution from the cooling fins. This heat flow distribution is controlled by varying the rate and volume of air flow across the fins.

For a one dimensional control of the bending due to thermal gradients in the tube, a single fan mounted to draw air along a path across the fins substantially parallel to the dimension being controlled is used. Feedback from the position detector determines the proper flow rate to maintain alignment.

Figure 4:
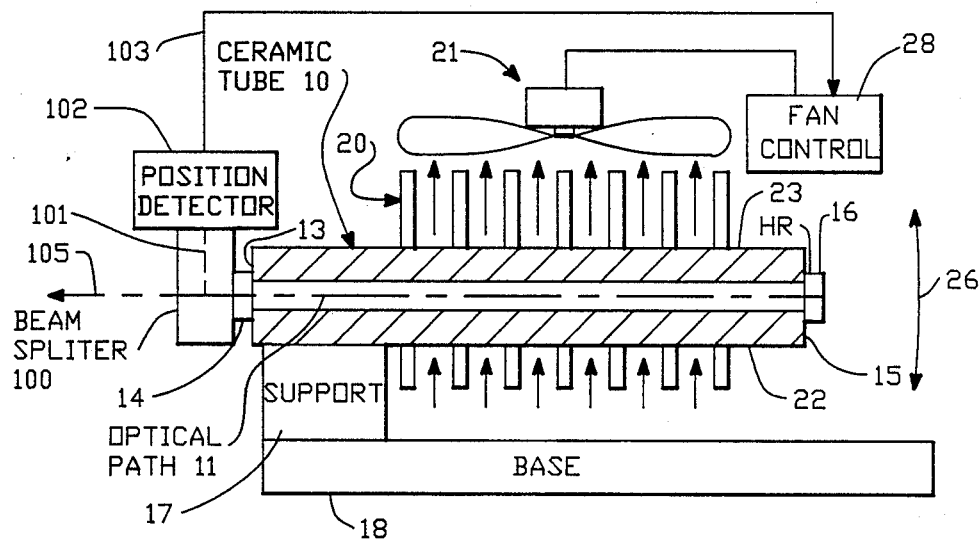
FIG. 4 is a schematic diagram of an air-cooled ion laser with an alignment adjustment system according to the present invention, wherein the beam position detector is mounted on the output end of the plasma tube.

In the embodiment of FIG. 1, the plasma tube 10 is supported near the first end 13. Bending will be translated into motion of the high reflector 16 at the second end 15 because the second end is free moving. Thus, the position detector 25 is mounted adjacent the element that has the largest degree of freedom due to bending. However, as illustrated in FIG. 4, the position detector could be mounted near the first end 13 with optics for directing a component of the output laser beam to the position detector. Bending of the plasma tube will result in motion of the resonant mode with respect to the optical path 11 at either end of the ceramic tube 10.

Also, the position detector 25 could be mounted on the laser base 18 rather than the tube 10. Mounting the detector 25 on the base 18 might provide greater sensitivity to beam position drift.

Figure 2:
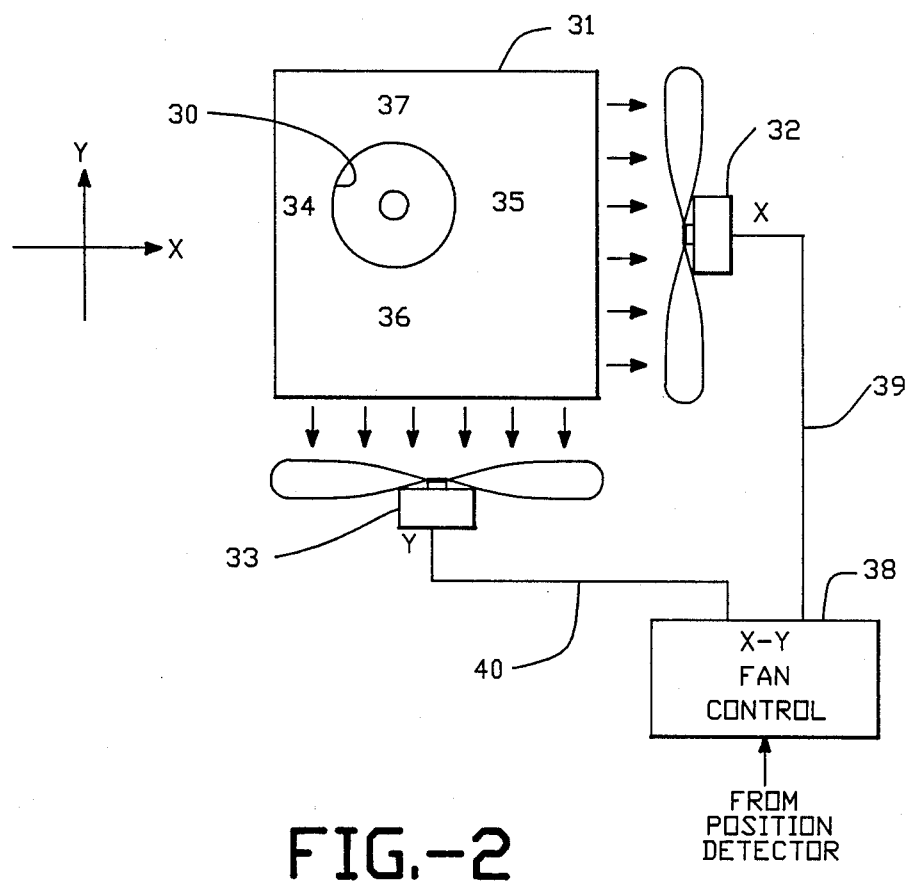
FIG. 2 is a schematic diagram illustrating the shape of transverse cooling fins and the flow of cooling medium across the cooling fins according to one embodiment of the present invention.

FIG. 2 is a schematic diagram of an apparatus according to the present invention providing for control in two dimensions of the bending due to thermal gradients in the plasma tube. As can be seen, plasma tube 30 is bonded to a sequence of cooling fins 31. A first fan 32 drawing air across the fins 31 along an X-axis and a second fan 33 drawing air across the cooling fins 31 along a Y-axis are included.

The cooling fin 31 is cut so that the area of the fin along the X-axis between the fan and the plasma tube 30 is greater than the area of the fin along the X-axis, between the plasma tube 30 and the source of cool air. Thus, cool air drawn along the X-axis will draw a greater amount of heat per unit area of the cooling fin out of the side 34 along the X-axis than out of the side 35, where the temperature of the cooling medium is greater.

Likewise, the cooling fin 31 is shaped so that the area 36 along the Y-axis between the plasma tube 30 and the fan 33 drawing air along the Y-axis is greater than the area 37 between the plasma tube 30 and the source of the cooling medium along the Y-axis.

If the fan directions were reversed to blow cool air onto the cooling fins, rather than to draw cool air across them, as shown in FIG. 2, then the symmetry of cooling fins would be adjusted accordingly.

Using the system of FIG. 2, a position detector 25 would be implemented with a device such as a Quad-Cell, dither system or other null position detector which generates a signal indicating deflection along the X-axis and the Y-axis. Thus, the fan control logic 38 would generate an X fan control signal 39 and a Y fan control signal 40 to control bending of the plasma tube.

Figure 3:
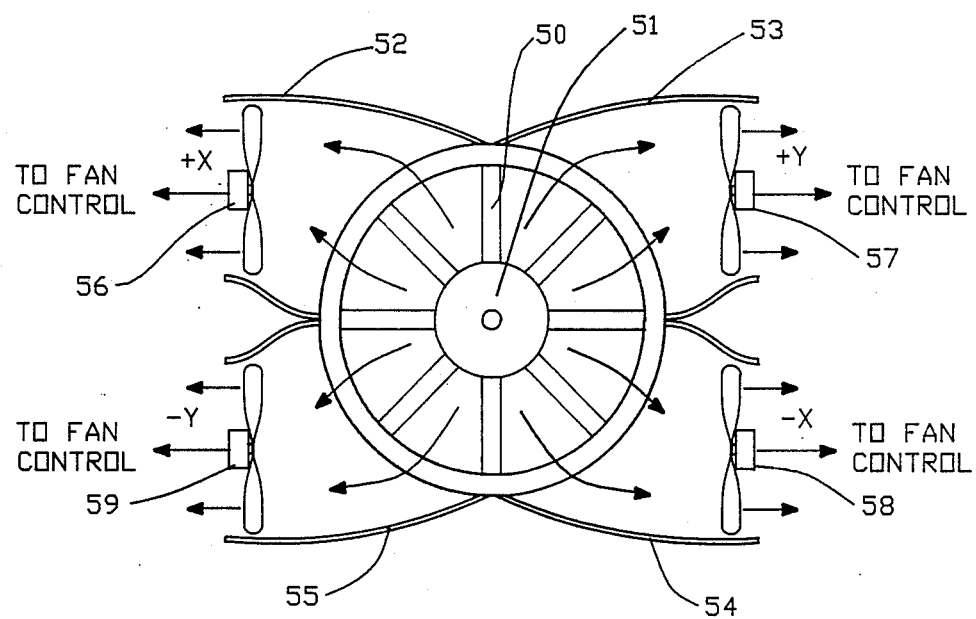
FIG. 3 is a schematic diagram illustrating an embodiment of the present invention with axial cooling fins.

FIG. 3 illustrates yet an alternative embodiment of an apparatus for controlling bending of a plasma tube according to the present invention. In the embodiment of FIG. 3, the plurality of cooling fins 50 are mounted radially along the plasma tube 51 forming axial passages for the cooling medium. The radial cooling fins 50 are segmented by a first plenum 52, a second plenum 53, a third plenum 54 and a fourth plenum 55 which guide a cooling medium across the fins.

The first plenum 52 supplies a cooling medium to a group of fins on a +X side of the plasma tube 51. The second plenum 53 supplies cooling medium to fins along a +Y side of the plasma tube 51. The third plenum 54 supplies cooling medium along cooling fins on the −X side of the plasma tube 51. The fourth plenum 55 supplies the cooling medium along the −Y side of the plasma tube 51. Each plenum is coupled to respective fans 56, 57, 58 and 59. Each of the fans is independently coupled to fan control logic so that four degrees of freedom for controlling the heat flow distribution out of the ceramic tube are provided.

FIG. 4 illustrates an alternative embodiment of an air-cooled ion laser with alignment adjustment according to the present invention. The embodiment in FIG. 4 is equivalent to that in FIG. 1, except that the position detector is mounted on the end adjacent the output coupler 14. The reference numbers used in FIG. 1 for identical elements are given identical reference numbers in FIG. 4. Accordingly, the structure of the laser will not be described, except for the differences.

The differences between the embodiment of FIG. 1 and the embodiment of FIG. 4 include the beam splitter 100 mounted adjacent the output coupler 14 on the first end 13 of the plasma tube 10. The beam splitter 100 directs a small portion 101 of the output beam 105 to a position detector 102. The position detector 102 generates the control signal on line 103 which indicates the drift of the resonant mode within the plasma tube. The signal on line 103 is supplied to the fan control logic 23 which controls the fan 21.

The mechanism of the present invention for controlling alignment of a laser may be applied to any system in which an optic element guiding the laser beam along an optical path is mounted on a structural member subject to bending due to thermal gradients.

The cooling medium could be liquid or gas, so long as the plenum adapted to flow the cooling medium across the cooling fins was appropriately designed.

The cooling fins may be formed of copper, aluminum or other heat conducting material as known in the art. They are welded or braised to the ceramic tube 10 using techniques well known in the art.

In addition, the shape of the cooling fins can be altered to provide biases desired in bending of the tube.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A laser apparatus, including a laser beam source for generating a laser beam, and heat incident with the production of the laser beam, the apparatus having an optical path for the laser beam, comprising:
    a structural member, having a first end and a second end, the optical path extending between the first end and the second end, the structural member comprising a heat conducting structural material thermally coupled to the laser beam source and characterized by thermal expansion and contraction causing bending of the structural member due to thermal gradients in the structural material;
    means, mounted on the structural member, for guiding the laser beam along the optical path;
    detector means, mounted along the optical path of the laser beam, for generating a position signal indicating drift of the laser beam from a preferred position due to a misalignment of the means for guiding caused by bending of the structural member;
    cooling means, thermally coupled to the structural material and connected to the detector means, for conducting heat out of the structural material in a controlled distribution in response to the position signal so that the misalignment is reduced.

2. The apparatus of claim 1, wherein the cooling means comprises:
    a plurality of cooling fins formed of heat conducting material thermally connected to the structural material; and
    means for generating a controlled flow of a cooling medium across the plurality of cooling fins in response to the position signal.

3. The apparatus of claim 1, wherein the means for guiding includes:
    a first means, mounted on the first end of the structural member for reflecting the laser beam along the optical path between the first end and the second end; and
    a second means, mounted on the second end of the structural member for reflecting the laser beam along the optical path between the first end and the second end.

4. The apparatus of claim 3, wherein the first means is an output coupler and the second means is a high reflecting mirror, and the output coupler and high reflecting mirror define a laser resonant cavity within the structural member.

5. The apparatus of claim 4, wherein the detector means is mounted along the optical path on the structural member near the second end, and generates the position signal in response to a component of the laser beam transmitted by the high reflecting mirror.

6. The apparatus of claim 4, wherein the detector means includes:
    a beam splitter mounted on the structural member near the first end outside the output coupler for deflecting a component of the laser beam transmitted by the output coupler away from the optical path;
    a detector mounted with the beam splitter for generating the position signal in response to the component.

7. The apparatus of claim 2, wherein the optical path through the structural member lies along a z-axis of a rectangular coordinate system, and the plurality of cooling fins are substantially parallel to an x-y plane orthogonal to the z-axis, and wherein the detector means includes a detector surface intersected by the z-axis, and the position signal indicates drift along an x-axis substantially parallel to the x-y plane.

8. The apparatus of claim 2, wherein the optical path through the structural member lies along a z-axis of a rectangular coordinate system, and the plurality of cooling fins are substantially parallel to an x-y plane orthogonal to the z-axis, and wherein the detector means includes a detector surface intersected by the z-axis, and the position signal indicates drift along an x-axis and a y-axis substantially parallel to the x-y plane.

9. The apparatus of claim 2, wherein the optical path through the structural member lies along a longitudinal axis, and the plurality of cooling fins extend radially out from the longitudinal axis, and wherein the detector means includes a detector surface intersected by the longitudinal axis, and the position signal indicates drift along a radial axis substantially orthogonal to the longitudinal axis.

10. The apparatus of claim 2, wherein the optical path through the structural member lies along a longitudinal axis, and the plurality of cooling fins extend radially out from the longitudinal axis, and wherein the detector means includes a detector surface intersected by the longitudinal axis, and the position signal indicates drift along a first radial axis and a second radial axis substantially orthogonal to the longitudinal axis.

11. The apparatus of claim 1, wherein the structural member encloses the heat source.

12. The apparatus of claim 11, wherein the heat source comprises a laser gain medium.

13. A laser apparatus having an optical path for a laser beam, comprising:
    a plasma tube having a first end and a second end and enclosing a gas laser gain medium along the optical path between the first end and the second end, the plasma tube being formed of a material conducting heat out of the laser gain medium and characterized by thermal expansion and contraction causing bending of the plasma tube due to thermal gradients in the plasma tube;
    a first means, mounted on the first end of the tube, for reflecting the laser beam along the optical path through the gain medium; and a second means, mounted on the second end of the tube, for reflecting the laser beam along the optical path through the gain medium detector means, mounted along the optical path of the laser beam, for generating a position signal indicating drift of the laser beam from a preferred position due to a misalignment of the first means and the second means caused by bending of the plasma tube;

cooling means, thermally coupled to the plasma tube and connected to the detector means, for conducting heat out of the plasma tube in a controlled distribution in response to the position signal so that the misalignment is reduced.

14. The apparatus of claim 13, wherein the cooling means comprises:

a plurality of cooling fins formed of heat conducting material thermally connected to the plasma tube; and means for generating a controlled flow of a cooling medium across the plurality of cooling fins in response to the position signal.

15. The apparatus of claim 13, wherein the first means is an output coupler and the second means is a high reflecting mirror, and the output coupler and high reflecting mirror define a laser resonant cavity within the plasma tube.

16. The apparatus of claim 15, wherein the detector means is mounted along the optical path outside the plasma tube near the second end, and generates the position signal in response to a component of the laser beam transmitted by the high reflecting mirror.

17. The apparatus of claim 15, wherein the detector means includes:

a beam splitter mounted on the structural member near the first end outside the output coupler for deflecting a component of the laser beam transmitted by the output coupler away from the optical path;

a detector mounted with the beam splitter for generating the position signal in response to the component.

18. The apparatus of claim 14, wherein the optical path through the plasma tube lies along a z-axis of a rectangular coordinate system, and the plurality of cooling fins are substantially parallel to an x-y plane orthogonal to the z-axis, and wherein the detector means includes a detector surface intersected by the z-axis, and the position signal indicates drift along an x-axis substantially parallel to the x-y plane 19. The apparatus of claim 14, wherein the optical path through the plasma tube lies along a z-axis of a rectangular coordinate system, and the plurality of cooling fins are substantially parallel to an x-y plane orthogonal to the z-axis, and wherein the detector means includes a detector surface intersected by the z-axis, and the position signal indicates drift along an x-axis and a y-axis substantially parallel to the x-y plane.

20. The apparatus of claim 14, wherein the optical path through the plasma tube lies along a longitudinal axis, and the plurality of cooling fins extend radially out from the longitudinal axis, and wherein the detector means includes a detector surface intersected by the longitudinal axis, and the position signal indicates drift along a radial axis substantially orthogonal to the longitudinal axis.

21. The apparatus of claim 14, wherein the optical path through the plasma tube lies along a longitudinal axis, and the plurality of cooling fins extend radially out from the longitudinal axis, and wherein the detector means includes a detector surface intersected by the longitudinal axis, and the position signal indicates drift along a first radial axis and a second radial axis substantially orthogonal to the longitudinal axis.

* * * * *